United States Patent
Sato (10) Patent No.: US 9,057,346 B2
(45) Date of Patent: Jun. 16, 2015

(54) INTAKE MANIFOLD

(75) Inventor: Shingo Sato, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/009,399

(22) PCT Filed: Apr. 3, 2012

(86) PCT No.: PCT/JP2012/002322
§ 371 (c)(1),
(2), (4) Date: Oct. 2, 2013

(87) PCT Pub. No.: WO2012/137486
PCT Pub. Date: Oct. 11, 2012

(65) Prior Publication Data
US 2014/0014056 A1 Jan. 16, 2014

(30) Foreign Application Priority Data
Apr. 4, 2011 (JP) .................. 2011-082660

(51) Int. Cl.
*F02M 35/00* (2006.01)
*F02M 35/108* (2006.01)
*F02M 25/07* (2006.01)
*F02M 35/10* (2006.01)
*F02M 35/112* (2006.01)

(52) U.S. Cl.
CPC ......... *F02M 35/108* (2013.01); *F02M 25/0722* (2013.01); *F02M 25/0751* (2013.01); *F02M 35/10072* (2013.01); *F02M 35/10111* (2013.01); *F02M 35/112* (2013.01); *Y02T 10/121* (2013.01); *F02M 35/10222* (2013.01); *F02M 25/0747* (2013.01)

(58) Field of Classification Search
CPC ...................... F02D 41/0002; F02M 35/10039; F02M 35/10072; F02M 35/104; F02M 35/108; F02B 27/0263; F02B 27/02
USPC ............. 123/184.47, 184.59, 184.21, 184.45, 123/184.48, 184.55, 184.56
See application file for complete search history.

(56) References Cited

U.S. PATENT DOCUMENTS

| 5,740,770 | A * | 4/1998 | Morota .................... 123/184.55 |
| 6,807,957 | B2 * | 10/2004 | Ko ................................ 123/572 |
| 7,305,958 | B2 * | 12/2007 | Doko et al. .............. 123/184.21 |
| 8,511,289 | B2 * | 8/2013 | Tanikawa et al. ........ 123/568.17 |
| 2006/0191505 | A1 * | 8/2006 | Doko et al. .............. 123/184.59 |
| 2010/0288247 | A1 * | 11/2010 | Tanikawa et al. ........ 123/568.11 |

FOREIGN PATENT DOCUMENTS

| JP | 5-180091 | 7/1993 |
| JP | 8-144868 | 6/1996 |
| JP | 2006-241992 | 9/2006 |
| JP | 2007-211698 | 8/2007 |

OTHER PUBLICATIONS

International Search Report for PCT/JP2012/002322 mailed May 1, 2012.

* cited by examiner

*Primary Examiner* — Stephen K Cronin
*Assistant Examiner* — Long T Tran
(74) *Attorney, Agent, or Firm* — Nixon & Vanderhye P.C.

(57) ABSTRACT

An intake manifold is equipped with a sub-stream passage connected to branch passages through respective connection ports to introduce intake-air substream other than intake-air mainstream to the plural branch passages. Two of the branch passages which communicate with each other through the sub-stream passage and successively introduce intake air to the internal combustion engine are defined as a first combination. Of the first combinations, a second combination is defined to have a shortest communication length via the substream passage. Of the second combination, the connection port of one of the branch passages where the intake air is introduced later is narrower than that of the other of the branch passages where the intake air is introduced earlier.

3 Claims, 4 Drawing Sheets

INTAKE MANIFOLD

This application is the U.S. national phase of International Application No. PCT/JP2012/002322 filed 3 Apr. 2012 which designated the U.S. and claims priority to JP 2011-082660 filed 4 Apr. 2011, the entire contents of each of which are hereby incorporated by reference.

CROSS REFERENCE TO RELATED APPLICATION

This disclosure is based on Japanese Patent Application No. 2011-82660 filed on Apr. 4, 2011, the disclosure of which is incorporated herein by reference.

TECHNICAL FIELD

This disclosure is related to an intake manifold for introducing intake air into an internal combustion engine.

BACKGROUND ART

Conventionally, an intake manifold is known to include a surge tank which accepts intake-air mainstream mainly containing new air and plural branch passages branched from the surge tank to introduce the intake-air mainstream to an internal combustion engine one by one.

Furthermore, an intake manifold is known, which introduces intake-air substream containing components other than new air to an internal combustion engine, together with intake-air mainstream. For example, exhaust gas recirculated to the engine (EGR gas) or blowby gas (PCV gas) obtained by ventilating a crankcase of the engine is included in the intake-air substream, which is made to join the intake-air mainstream. Hereafter, gas to be introduced into a cylinder by being contained in the intake-air substream such as EGR gas or PCV gas may be referred as target gas.

By the way, for such an intake manifold, various measurements are considered in order to restrict the ratio of the target gas from varying between cylinders, as to components of the intake air drawn into each cylinder.

For example, an intake manifold of Patent document 1 introduces intake-air substream including EGR gas as the target gas together with the intake-air mainstream, to the engine. Moreover, in the intake manifold of Patent document 1, a surge tank has the same number of ports as the branch passages, and the ports oppose to respective upstream openings of the branch passages in the surge tank. According to the intake manifold of Patent document 1, the opening area of the port is made to be smaller as departing from a feed port of the intake-air mainstream in the surge tank.

The inflow amount of the intake-air mainstream becomes smaller as the branch passage is departing from the feed port, thereby the inflow amount of the intake-air substream can be reduced as the branch passage is located more distant from the feed port. Thus, the ratio of the target gas can be equalized between the cylinders.

Moreover, an intake manifold of Patent document 2 introduces intake-air substream including PCV gas as the target gas together with the intake-air mainstream to the engine, and includes a sub-stream passage connected to each of the branch passages so as to introduce the intake-air substream to each of the branch passages. The sub-stream passage is prepared so that a pressure loss of the intake-air substream becomes equal among all of the branch passages, from a feed port of the target gas to the connection port of the branch passage.

Thereby, the ratio of the target gas can be equalized between the cylinders.

However, according to the intake manifold of Patent document 1, in a case where intake air is introduced through a specific branch passage, the intake-air substream is introduced not only from a port opposing the specific branch passage but also from the other ports. For this reason, the ratio of the target gas does not necessarily become equal between the cylinders.

In contrast, according to the intake manifold of Patent document 2, in a case where intake air is introduced through a specific branch passage, the target gas is introduced only through a fixed passage from the feed port to the connection port of the specific branch passage, so it can be seen that the target gas will be distributed uniformly.

However, in the case where intake air is introduced through the specific branch passage in the intake manifold of Patent document 2, the intake-air substream includes a portion of intake air which remains in the other branch passages by drawing the remaining intake air through the sub-stream passage, in addition to a portion introduced from the feed port of the target gas. That is, the sub-stream passage will function also as a passage which communicates the branch passages with each other. Due to the function, in the case where intake air is introduced through the specific branch passage, a portion of the remaining intake air remaining in the other branch passage is drawn through the sub-stream passage. For this reason, the ratio of the target gas will vary between the cylinders according to the remaining amount of the target gas in the remaining intake air remaining in the other branch passage.

RELATED ART DOCUMENT

Patent Document

Patent document 1: JP-H08-144868A
Patent document 2: JP-2006-241992A

SUMMARY OF THE INVENTION

It is an object of the present disclosure to provide an intake manifold in which a ratio of a target gas is restricted from varying between cylinders.

According to a first aspect of the present disclosure, an intake manifold includes a surge tank which accepts an intake-air mainstream containing new air as a main component, a plurality of branch passages branched from the surge tank to introduce the intake-air mainstream to an internal combustion engine in succession, and a sub-stream passage connected to each of the plurality of branch passages through respective connection port to introduce an intake-air substream other than the intake-air mainstream to each of the plurality of branch passages. The intake-air substream and the intake-air mainstream are introduced to the internal combustion engine together.

Further, two of the branch passages selected from the plurality of branch passages define a first combination, which is one of a plurality of first combinations, in which the two of the branch passages communicate with each other through the sub-stream passage and successively introduce intake air to the internal combustion engine. Of the plurality of first combinations, a second combination is defined to have a shortest communication length by which the two of the branch passages communicate with each other through the sub-stream passage. Of the second combination, the connection port of one of the branch passages where the intake air is introduced later is set narrower than that of the other of the branch passages where the intake air is introduced earlier.

Thereby, the ratio of the target gas is restricted from varying between the cylinders.

As stated in Background Art, in the structure where the sub-stream passage, which introduces the intake-air substream into the branch passages, is connected to each of the branch passages, the ratio of the target gas will differ between the cylinders according to the remaining amount of the target gas in the intake air remaining in the other branch passage other than the branch passage to which intake air is being introduced.

Here, by focusing one branch passage (hereafter referred as focused branch passage), temporal change in the remaining amount of the target gas is considered at the focused branch passage.

After intake air is introduced in the focused branch passage and before intake air is introduced in the focused branch passage the next time, intake air is successively introduced in the other branch passages. Each time when the intake air introduction is performed, the remaining intake air is drawn into the other branch passages through the sub-stream passage from the focused branch passage. For this reason, the remaining amount of the target gas in the focused branch passage decreases whenever the intake air introduction is performed in the other branch passages one by one, and increases again greatly by the next intake air introduction, then, decreases similarly.

For this reason, it is thought that the ratio of the target gas becomes large in intake air introduced through the branch passage where the intake-air introduction is performed subsequent to the focused branch passage (hereafter referred as subsequent introduction branch passage) rather than the ratio of the target gas in intake air introduced through the other branch passage other than the subsequent introduction branch passage.

Moreover, the remaining intake air is easy to be drawn from the focused branch passage, as the communication length via the sub-stream passage is shorter between the branch passage where the intake-air introduction is being performed and the focused branch passage.

Accordingly, it is thought that the ratio of the target gas in the intake air introduced through the subsequent introduction branch passage having the shortest communication length via the sub-stream passage, i.e., the branch passage having a relationship of the second combination with the focused branch passage, becomes fairly large rather than the ratio of the target gas in the intake air introduced through the focused branch passage.

Then, the connection port of one of the branch passages where the intake air is introduced later is set narrower than that of the other of the branch passages where the intake air is introduced earlier, of the second combination.

Thereby, when the focused branch passage and the subsequent introduction branch passage have the relationship of the second combination, the remaining intake air becomes difficult to flow into the subsequent introduction branch passage from the focused branch passage. Further, the intake-air substream becomes difficult to flow into the subsequent introduction branch passage as a whole. For this reason, the ratio of the target gas can be lowered in the intake air introduced through the subsequent introduction branch passage.

Accordingly, the ratio of the target gas is restricted from varying between the cylinders.

For example, the shortest communication length is approximately equal to a second-shortest communication length by which other two of the branch passages communicate with each other via the sub-stream passage, of the plurality of first combinations.

Then, when the second combination is defined as one of a plurality of second combinations having both of the shortest communication length and the second-shortest communication length, the connection port of one of the branch passages where the intake air is introduced later is narrower than that of the other of the branch passages where the intake air is introduced earlier, of each of the plurality of second combinations.

Thereby, the ratio of the target gas is restricted from varying between the cylinders more effectively in a case where the two sets of the second combination exist.

For example, the sub-stream passage has an upstream region and at least two first branch ways branched from the upstream region, and each of the first branch ways is further divided into two second branch ways. One of the second branch ways is connected to one of the branch passages defining the second combination, and the other of the second branch ways is connected to the other of the branch passages defining the second combination.

Thereby, the communication length via the sub-stream passage can be made much shorter between the two branch passages defining the second combination. For this reason, between the two branch passages defining the second combination, when the intake-air introduction is being performed in one of the two branch passages, the remaining intake air can be more easily drawn from the other of the two branch passages. For this reason, the effect of restricting the variation can be acquired notably.

BRIEF DESCRIPTION OF DRAWINGS

FIG. 4(*a*) is a drawing concerning the embodiment which shows EGR rate in case where an equivalent circle diameter of a connection port of a sub-stream passage is made different among branch passages and among cylinders, and FIG. 4(*b*) is a drawing concerning a comparison example which shows EGR rate in case where an equivalent circle diameter of a connection port is made the same among all branch passages and among all cylinders.

EMBODIMENT TO PRACTICE THE INVENTION

An intake manifold includes a surge tank which accepts an intake-air mainstream containing new air as a main component; plural branch passages branched from the surge tank to introduce the intake-air mainstream to an internal combustion engine in succession; and a sub-stream passage connected to each of the plural branch passages through respective connection port to introduce an intake-air substream other than the intake-air mainstream to each of the plural branch passages. The intake-air substream and the intake-air mainstream are introduced to the internal combustion engine together.

Further, two of the branch passages selected from the plural branch passages define a first combination, which is one of a plurality of first combinations, in which the two of the branch passages communicate with each other through the sub-stream passage and successively introduce intake air to the internal combustion engine. Of the plurality of first combinations, a shortest communication length via the sub-stream passage is approximately equal to a second-shortest communication length via the sub-stream passage.

When both of the shortest communication length and the second-shortest communication length are defined to belong to a second combination which is one of a plurality of second combinations, the connection port of one of the branch passages where the intake air is introduced later is set narrower than that of the other of the branch passages where the intake air is introduced earlier, of each of the plurality of second combinations.

Further, the sub-stream passage is divided into at least two first branch ways branched from an upstream region, and each of the first branch ways is further divided into two second branch ways. One of the second branch ways is connected to one of the branch passages defining the second combination, and the other of the second branch ways is connected to the other of the branch passages defining the second combination.

A structure of an intake manifold 1 is explained based on the drawings.

The intake manifold 1 introduces intake air into an internal combustion engine (not shown), for example, with four cylinders having reciprocating structure, and is equipped with the following structure.

Figure 1:
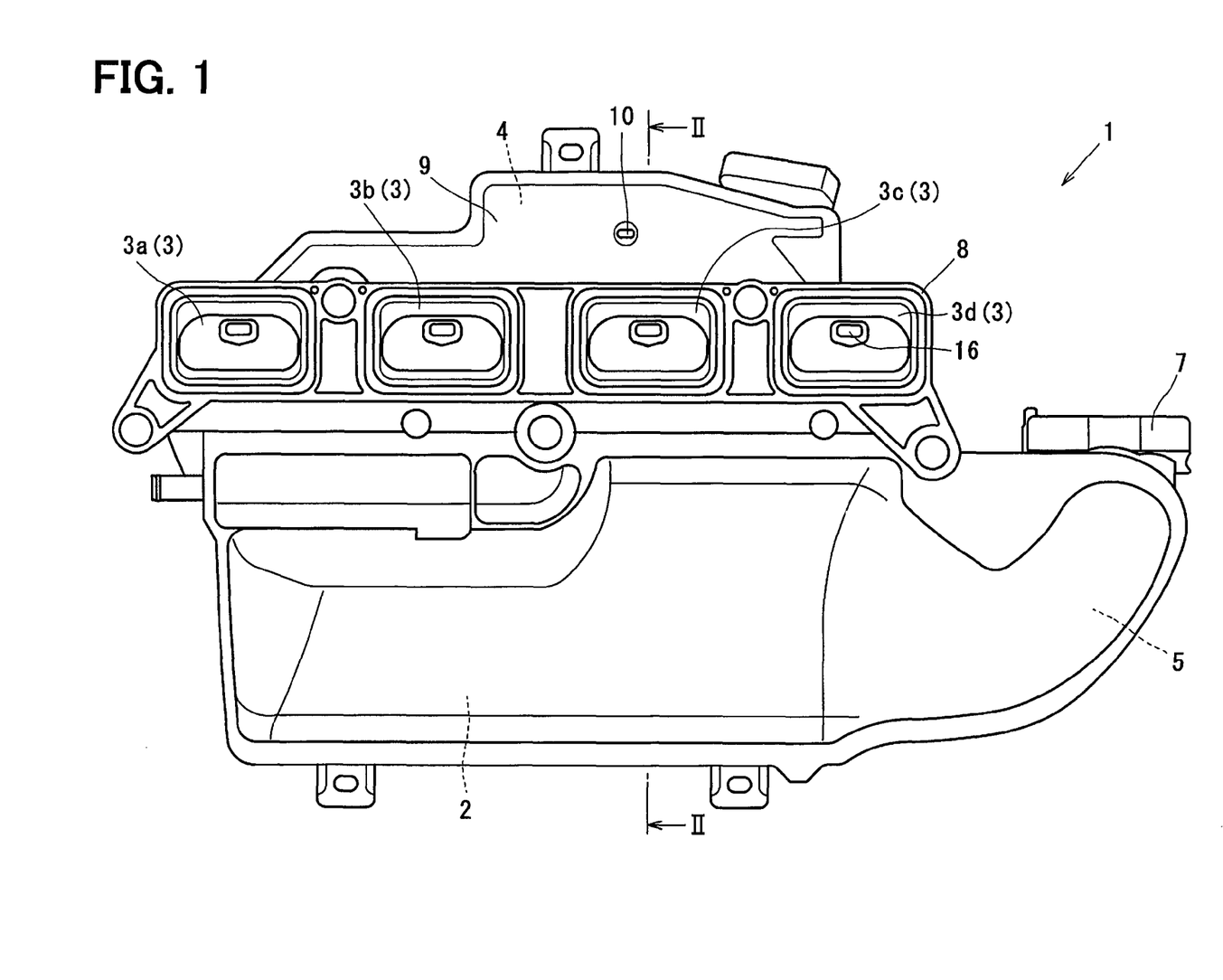
FIG. 1 is a schematic view illustrating an intake manifold according to an embodiment.
Figure 2:
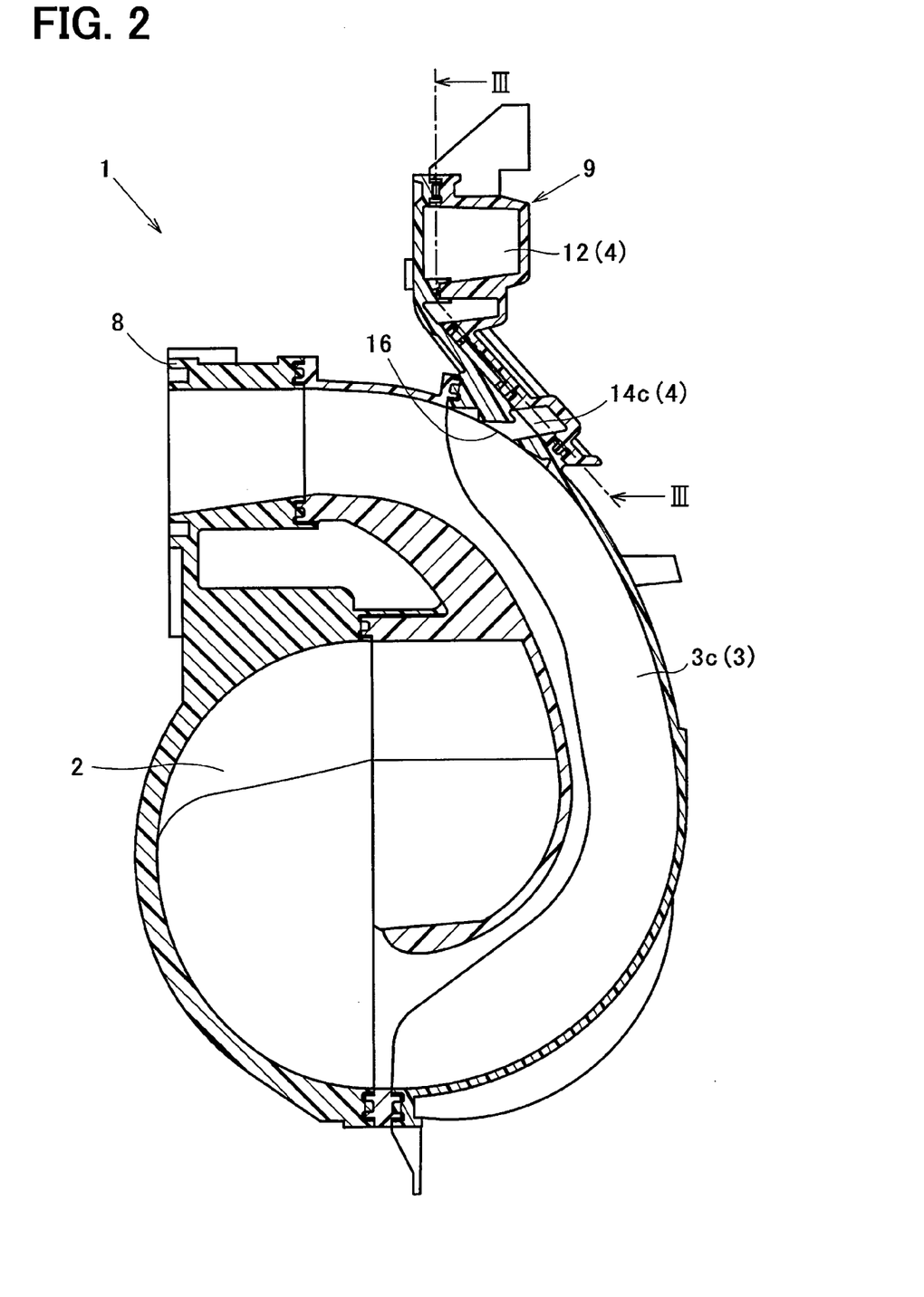
FIG. 2 is a cross-sectional view taken along a line II-II in FIG. 1.

Namely, the intake manifold 1 includes a surge tank 2 which accepts intake-air mainstream containing new air as a major component, four branch passages 3 branched from the surge tank 2 to introduce the intake-air mainstream to each cylinder of the internal combustion engine one by one, a sub-stream passage 4 connected to each of the branch passages 3 through a respective connection port 16 to introduce an intake-air substream other than the intake-air mainstream to each of the branch passages 3, and an introducing path 5 connected to the surge tank 2 to introduce the intake-air mainstream. The intake-air mainstream and the intake-air substream are introduced to each cylinder of the internal combustion engine together.

The intake-air substream is a flow of intake air containing gas such as exhaust gas (EGR gas) recirculated to the internal combustion engine, blowby gas (PCV gas) obtained by ventilating a crankcase of the internal combustion engine, or purge gas of a canister, in addition to new air, and is supplied to the branch passages 3 through the sub-stream passage 4. The intake-air substream joins the intake-air mainstream in the branch passages 3, and is introduced into each cylinder. Hereafter, a gas to be introduced into each cylinder by being contained in the intake-air substream such as EGR gas or PCV gas may be referred as target gas.

The intake manifold 1 is produced, for example, by joining plural parts, which are made of resin and manufactured by resin molding, using vibration welding. Moreover, the upstream end of the introducing path 5 is provided to a flange 7, and a throttle body (not shown) is connected to the flange 7. Moreover, the downstream ends of the branch passages 3 are arranged to a flange 8 along a linear line, corresponding to the arrangement of the plural cylinders of the internal combustion engine.

The intake manifold 1 is screw-fastened to the internal combustion engine through the flange 8 such that each of the branch passages 3 can communicate with the corresponding cylinder.

Moreover, a protrusion part 9 is provided to adjacency of the downstream ends of the branch passages 3, i.e., adjacency of the flange 8, and the sub-stream passage 4 is defined in the protrusion part 9. The protrusion part 9 is formed to extend away from the surge tank 2 through the branch passage 3. A feed port 10 of the target gas is opened in the protrusion part 9.

Features of the intake manifold 1 are explained based on the drawings.

First, each of the branch passages 3 has an approximate arc shape so as to introduce intake air to turn and spin from the upstream end connected to the surge tank 2 to the downstream end connected to the internal combustion engine. Moreover, the four branch passages 3 are arranged in an arrangement direction without crossing mutually such that the upstream ends and the downstream ends correspond to the arrangement of the cylinders in the internal combustion engine.

Here, with respect to the arrangement direction where the four branch passages 3 are arranged in a line, the branch passages 3 are called as the branch passage 3a, 3b, 3c, 3d one by one in order from the branch passage 3 farthest from the introducing path 5 to the branch passage 3 nearest to the introducing path 5. The intake manifold 1 is fastened to the internal combustion engine in a manner that the branch passages 3a-3d introduce intake air to the cylinders #1, #2, #3, #4 of the internal combustion engine, respectively.

Thereby, when the internal combustion engine has the four cylinders with reciprocating structure, an order of ignition will be the cylinder #1, the cylinder #3, the cylinder #4, the cylinder #2, and the cylinder #1, therefore, an order of the intake-air introduction to the branch passages 3a-3d will be the branch passage 3a, the branch passage 3c, the branch passage 3d, the branch passage 3b, and the branch passage 3a. For this reason, as for a combination defined by two of the branch passages 3 where the intake-air introduction is performed successively, there are four combinations, i.e., the branch passages 3c and 3d, the branch passages 3d and 3b, the branch passages 3b and 3a, and the branch passages 3a and 3c.

Moreover, one of the branch passages 3 arbitrarily chosen from the four branch passages 3 is connected to all the other branch passages 3 through the sub-stream passage 4. That is, all the branch passages 3a-3d are connected with each other through the sub-stream passage 4.

For this reason, the four combinations, i.e., the branch passages 3c and 3d, the branch passages 3d and 3b, the branch passages 3b and 3a, and the branch passages 3a and 3c, correspond to first combinations in which the intake-air introduction to the internal combustion engine is performed successively and the communication is possible with each other through the sub-stream passage 4.

Figure 3:
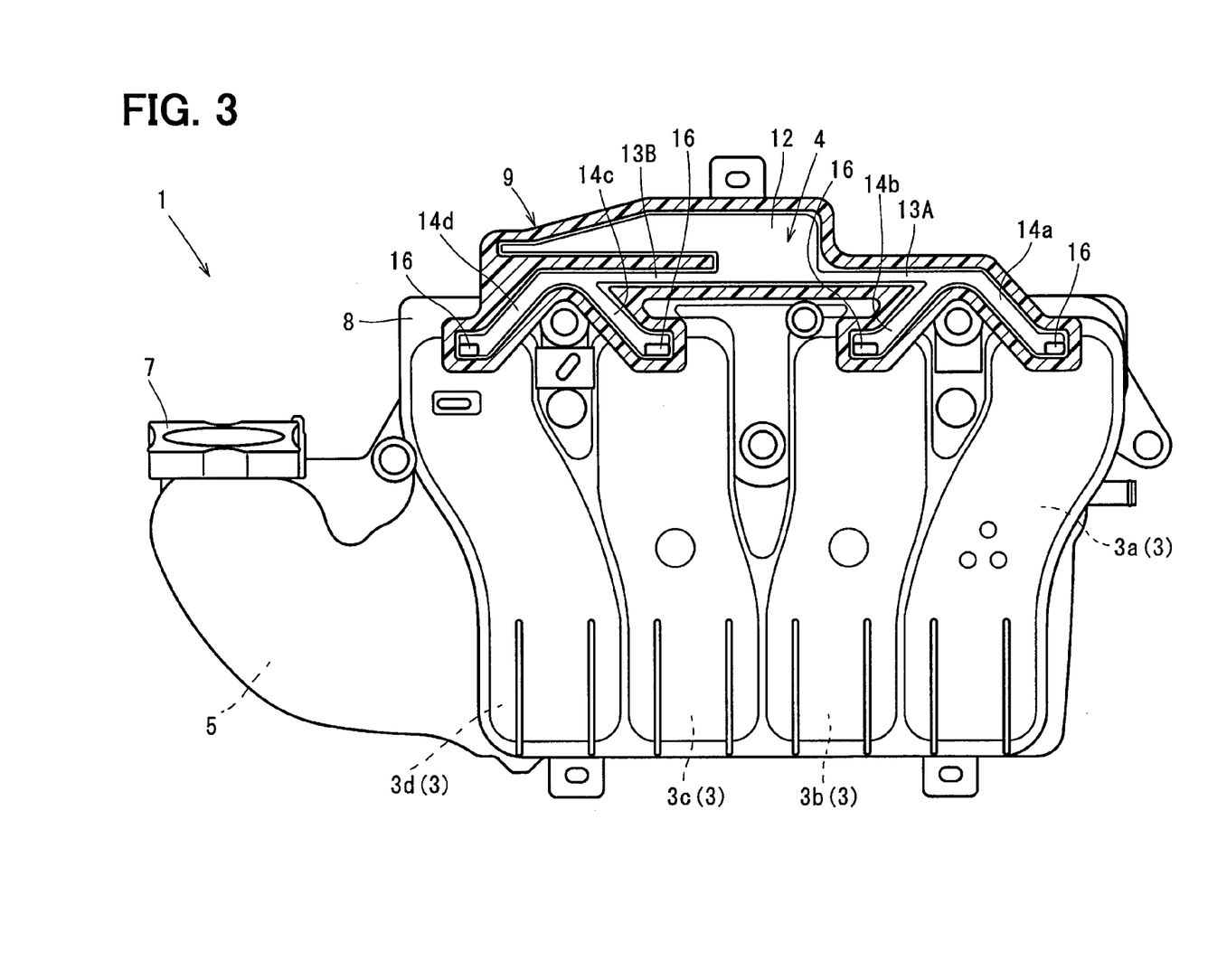
FIG. 3 is a schematic whole view illustrating the intake manifold, which includes a cross-sectional view taken along a line III-III in FIG. 2.

The sub-stream passage 4 has an upstream region 12 where the feed port 10 is opened, two of first branch ways 13A, 13B branched from the upstream region 12, two of second branch ways 14a, 14b branched from the first branch way 13A and connected to the branch passages 3a, 3b respectively, and two of second branch ways 14c, 14d branched from the first branch way 13B and connected to the branch passages 3c, 3d respectively. Moreover, the passage length is the same between the first branch ways 13A, 13B, and the passage length is the same among all the second branch ways 14a-14d.

Therefore, when the passage length of the first branch way 13A, 13B is defined as La, when the passage length of the second branch way 14a-14d is defined as Lb, and when a portion of the upstream region 12 to which the first branch ways 13A, 13B are connected is defined to have a passage length Lc, the branch passages 3a and 3b communicate with each other through the sub-stream passage 4 with a communication length of 2Lb, and the branch passages 3c and 3d communicate with each other through the sub-stream passage 4 with a communication length of 2Lb. Moreover, the branch passages 3a and 3c communicate with each other through the sub-stream passage 4 with a communication length of 2Lb+2La+Lc, the branch passages 3a and 3d communicate with each other through the sub-stream passage 4 with a communication length of 2Lb+2La+Lc, the branch passage 3b and 3c communicate with each other through the sub-stream passage 4 with a communication length of 2Lb+2La+Lc, and the branch passages 3b and 3d communicate with each other through the sub-stream passage 4 with a communication length of 2Lb+2La+Lc. For this reason, of all the first combinations, two combinations, i.e., the combination of the branch passages 3a and 3b and the combination of the branch passages 3c and 3d, have the shortest communication length.

By the above, when the two of the first combinations having the shortest communication length are defined as second combinations, the combination of the branch passages 3a and 3b and the combination of the branch passages 3c and 3d are the second combinations.

In the two of the branch passages 3 defining the second combination, the connection port 16 to the sub-stream passage 4 is set narrower in the branch passage 3 where the intake-air introduction is performed later than in the branch passage 3 where the intake-air introduction is performed earlier.

That is, in the second combination of the branch passages 3a and 3b, intake air is introduced through the branch passage 3b firstly and intake air is introduced through the branch passage 3a secondly, therefore, the connection port 16 is narrower in the branch passage 3a than in the branch passage 3b. Moreover, in the second combination of the branch passages 3c and 3d, intake air is introduced through the branch passage 3c firstly and intake air is introduced through the branch passage 3d secondly, therefore, the connection port 16 is narrower in the branch passage 3d than in the branch passage 3c (refer to FIG. 3).

The intake manifold 1 of the embodiment is equipped with the sub-stream passage 4 connected to each of the branch passages 3 to introduce intake-air substream other than the intake-air mainstream to each of the branch passages 3, and the intake-air mainstream and the intake-air substream are introduced to the internal combustion engine together. Moreover, the first combination is defined by two of the branch passages 3 which communicate with each other through the sub-stream passage 4 and the intake-air introduction to the internal combustion engine is performed successively between the two of the branch passage 3. Further, of the first combinations, the second combination is defined to have the shortest communication length via the sub-stream passage 4. Of two of the branch passages 3 defining the second combination, the connection port 16 of one of the branch passages 3 where the intake air is introduced later is narrower than that of the other of the branch passages 3 where the intake air is introduced earlier.

Thereby, the ratio of the target gas is restricted from varying between the cylinders.

Figure 4:
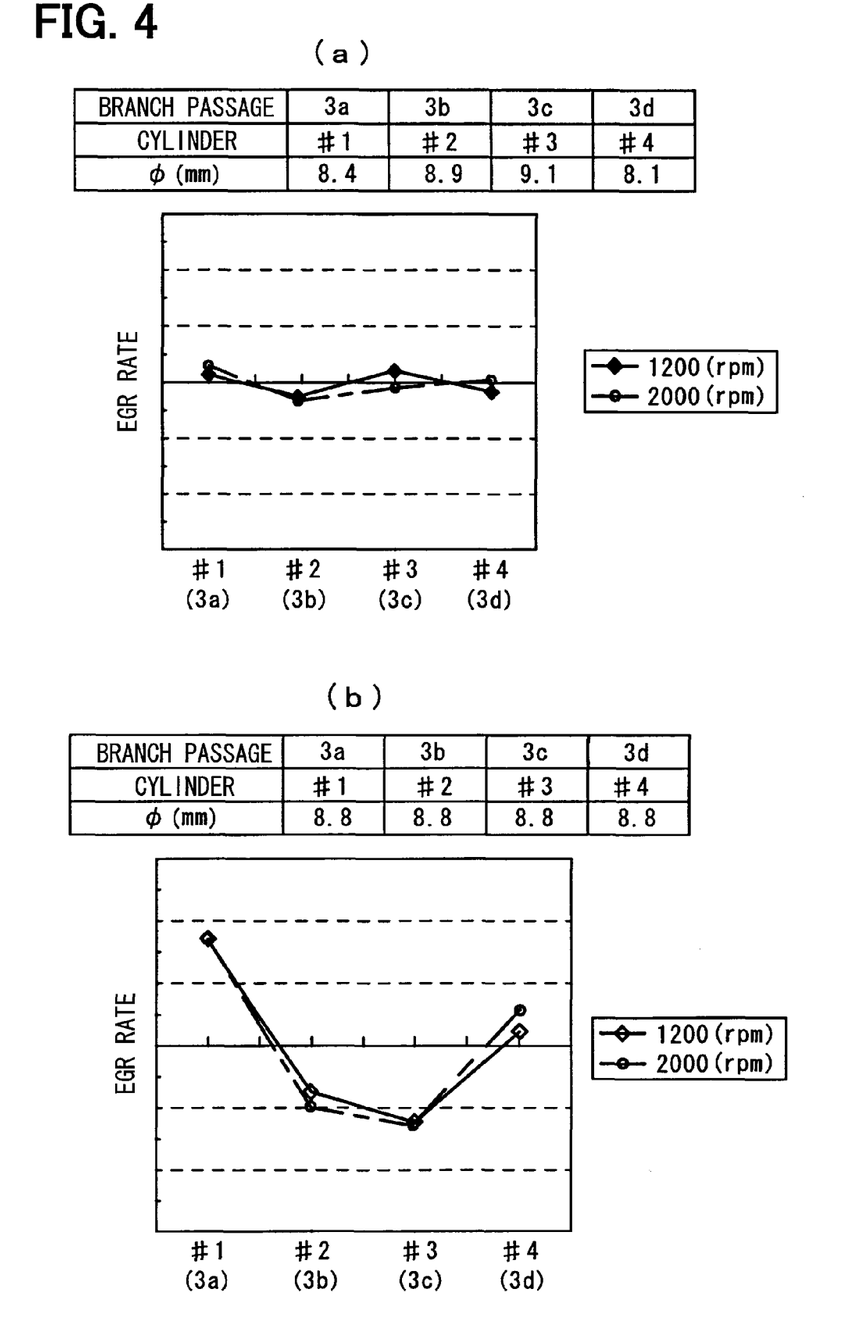

Here, the reason why the ratio of the target gas is restricted from varying between the cylinders is explained with reference to FIG. 4. In FIG. 4, the target gas is EGR gas, and EGR rate is shown for each of the branch passages 3a-3d (each of the cylinders #1-#4) when the rotation speed of the internal combustion engine is 1200 rpm or 2000 rpm.

Moreover, in FIG. 4(a), the branch passages 3a and 3b, which is one of the second combinations, have the connection ports 16 with equivalent circle diameter ø of 8.4 mm, 8.9 mm respectively, and the branch passages 3c and 3d, which is the other of the second combinations, have the connection ports 16 with equivalent circle diameter of 9.1 mm, 8.1 mm respectively. Moreover, FIG. 4(b) is a comparison example showing EGR rate when all of the branch passages 3a-3d have the connection ports 16 with the same equivalent circle diameter of 8.8 mm.

In a case where the sub-stream passage 4 which introduces intake-air substream into the branch passages 3 is individually connected to each of the branch passages 3a-3d, if the connection port 16 of the sub-stream passage 4 is the same among all of the branch passages 3, the ratio of the target gas will vary between the cylinders according to the remaining amount of the target gas in the remaining intake air in the other branch passages 3 other than the branch passage 3 where the intake-air introduction is being performed.

Here, under an assumption that the connection port 16 of the sub-stream passage 4 is the same among all of the branch passages 3, the branch passage 3b is focused, and time-elapse change is considered in the remaining amount of the target gas in the branch passage 3b. In addition, the branch passage 3 which defines the second combination with the branch passage 3b is the branch passages 3a.

After intake air is introduced in the branch passage 3b and before intake air is introduced in the branch passage 3b the next time, intake air is successively introduced in order of the branch passage 3a, the branch passage 3c and the branch passage 3d. Each time when the intake air introduction is performed, the remaining intake air is drawn through the sub-stream passage 4 from the branch passage 3b. For this reason, the remaining amount of the target gas in the branch passage 3b decreases whenever the intake air introduction is performed in order of the branch passages 3a, 3c and 3d one by one, and increases again greatly by the next intake air introduction, then, decreases similarly.

For this reason, when the intake-air introduction is performed in the branch passage 3a which is the next order of the branch passage 3b, the target gas in the remaining intake air is not yet decreased in the branch passage 3b where the intake-air introduction was performed immediately before. Therefore, much target gas is drawn from the branch passage 3b into the branch passage 3a, compared with the branch passage 3c, 3d.

Moreover, of the branch passages 3a, 3c, 3d, as the communication length via the sub-stream passage 4 is shorter between the branch passage 3b and the branch passage 3 where the intake-air introduction is being performed, the remaining intake air is easy to be drawn from the branch passage 3b. Therefore, the remaining intake air is easier to be drawn from the branch passage 3b when the intake-air introduction is being performed in the branch passage 3a rather than when the intake-air introduction is being performed in the branch passage 3c, 3d.

Accordingly, the ratio of the target gas in the intake air introduced through the branch passage 3a, which is in a relationship of the second combination with respect to the branch passage 3b, becomes fairly large rather than the ratio of the target gas in the intake air introduced through the branch passage 3b (refer to FIG. 4(b)).

Similarly, the ratio of the target gas in the intake air introduced through the branch passage 3d, which is in a relationship of the second combination with respect to the branch passage 3c, becomes fairly large rather than the ratio of the target gas in the intake air introduced through the branch passage 3c (refer to FIG. 4(b)).

Then, of the branch passages 3a, 3b defining the second combination, the connection port 16 of the sub-stream passage 4 is made narrower in the branch passage 3a where the intake air is introduced later than in the branch passage 3b where the intake air is introduced earlier. Similarly, the connection port 16 is made narrower in the branch passage 3*d* than in the branch passage 3*c* (refer to FIG. 4(*a*)).

Thereby, in the branch passages 3*a*, 3*b* having the relationship of the second combination, the remaining intake air becomes difficult to flow into the branch passage 3*a* from the branch passage 3*b*. Further, the intake-air substream becomes difficult to flow into the branch passage 3*a* as a whole. For this reason, the ratio of the target gas in the intake air introduced through the branch passage 3*a* can be lowered. Similarly, in the branch passages 3*c*, 3*d* having the relationship of the second combination, the ratio of the target gas in the intake air introduced through the branch passage 3*d* can be lowered.

By the above, the ratio of the target gas can be restricted from varying between the cylinders (refer to FIG. 4(*a*)).

Moreover, the sub-stream passage 4 has the upstream region 12 where the feed port 10 is opened, two of the first branch ways 13A, 13B branched from the upstream region 12, two of the second branch ways 14*a*, 14*b* branched from the first branch way 13A and connected to the branch passages 3*a*, 3*b* respectively, and two of the second branch ways 14*c*, 14*d* branched from the first branch way 13B and connected to the branch passages 3*c*, 3*d* respectively.

Thereby, the communication length via the sub-stream passage 4 is remarkably made short between the branch passages 3*a*, 3*b* and between the branch passages 3*c*, 3*d*, each of which defining the second combination, rather than the other combination of the branch passages 3. For this reason, in the case where the connection port 16 of the sub-stream passage 4 is the same among all of the branch passages 3, it is very easy to draw the remaining intake air from the branch passage 3*b* to the branch passage 3*a*, when the intake-air introduction is being performed in the branch passage 3*a*. Similarly, it is very easy to draw the remaining intake air from the branch passage 3*c* to the branch passage 3*d*, when the intake-air introduction is being performed in the branch passage 3*d*.

For this reason, according to the embodiment, in the branch passages 3*a*, 3*b* defining the second combination, the connection port 16 is made narrower in the branch passage 3*a* than in the branch passage 3*b*, and the connection port 16 is similarly made narrower in the branch passage 3*d* than in the branch passage 3*c*. Thus, the ratio of the target gas can be notably restricted from varying between the cylinders.

The aspect of the intake manifold 1 is not limited to the embodiment, and various modifications can be considered.

For example, although the intake manifold 1 of the embodiment introduces intake air into the internal combustion engine with four cylinders having the reciprocating structure, the internal combustion engine to which intake air is introduced by the intake manifold 1 may have six cylinders having the reciprocating structure, or may be V type or horizontally opposed type.

Moreover, according to the intake manifold 1 of the embodiment, of the plurality of first combinations, the shortest communication length and the second-shortest communication length are in approximately coincidence, and two sets of the second combinations exist. However, the aspect of the second combination is not limited to the above.

For example, when the shortest communication length and the second-shortest communication length are not approximately coincident, the connection port 16 of the sub-stream passage 4 may be made different in the second combination constructed by the shortest combination and the second-shortest combination.

Furthermore, of the plurality of first combinations, only one combination which has the shortest communication length may be set as the second combination, and the connection port 16 of the sub-stream passage 4 may be made different. Alternatively, the shortest combination, the second-shortest combination, and the third-shortest combination may be set as the second combination, and the connection port 16 of the sub-stream passage 4 may be made different. Alternatively, the shortest combination, the second-shortest combination, the third-shortest combination and the fourth-shortest combination may be set as the second combination, and the connection port 16 of the sub-stream passage 4 may be made different.

It is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

The invention claimed is:

1. An intake manifold comprising:
    a surge tank which accepts an intake-air mainstream containing new air as a main component;
    a plurality of branch passages branched from the surge tank to introduce the intake-air mainstream to an internal combustion engine in succession; and
    a sub-stream passage connected to each of the plurality of branch passages through a respective connection port to introduce an intake-air substream other than the intake-air mainstream to each of the plurality of branch passages, wherein
    the intake-air substream and the intake-air mainstream are introduced to the internal combustion engine together,
    two of the branch passages selected from the plurality of branch passages define a first combination, which is one of a plurality of first combinations, in which the two of the branch passages communicate with each other through the sub-stream passage and successively introduce intake air to the internal combustion engine,
    a second combination is defined to have a shortest communication length by which the two of the branch passages communicate with each other via the sub-stream passage, of the plurality of first combinations, and
    in the second combination, the connection port of one of the branch passages where the intake air is introduced later has an equivalent circle diameter that is smaller than that of the other of the branch passages where the intake air is introduced earlier.

2. The intake manifold according to claim 1, wherein
    the shortest communication length is approximately equal to a second-shortest communication length by which other two of the branch passages communicate with each other via the sub-stream passage, of the plurality of first combinations,
    the second combination is defined as one of a plurality of second combinations having both of the shortest communication length and the second-shortest communication length, and
    in each of the plurality of second combinations, the connection port of one of the branch passages where the intake air is introduced later has an equivalent circle diameter that is smaller than that of the other of the branch passages where the intake air is introduced earlier.

3. The intake manifold according to claim 1, wherein
    the sub-stream passage has an upstream region and at least two first branch ways branched from the upstream region, and each of the first branch ways is further divided into two second branch ways, and one of the second branch ways is connected to one of the branch passages defining the second combination, and the other of the second branch ways is connected to the other of the branch passages defining the second combination.

\* \* \* \* \*